United States Patent [19]

Yang

[11] Patent Number: 5,553,050
[45] Date of Patent: Sep. 3, 1996

[54] OPTICAL PICKUP SYSTEM

[75] Inventor: Keun Y. Yang, Seoul, Rep. of Korea

[73] Assignee: Goldstar Co., Ltd., Seoul, Rep. of Korea

[21] Appl. No.: 520,294

[22] Filed: Aug. 28, 1995

Related U.S. Application Data

[63] Continuation of Ser. No. 193,585, Feb. 8, 1994, abandoned.

[30] Foreign Application Priority Data

Feb. 8, 1993 [KR] Rep. of Korea .................. 1993-1658

[51] Int. Cl.$^6$ .................................................. G11B 07/00
[52] U.S. Cl. .......................... 369/103; 369/109; 369/100
[58] Field of Search ................................. 369/103, 112, 369/44.12, 44.26, 44.34, 44.11, 109, 100; 359/15, 19

[56] References Cited

U.S. PATENT DOCUMENTS

| | | | |
|---|---|---|---|
| 4,835,378 | 5/1989 | Coops | 250/201 |
| 4,904,856 | 2/1990 | Nagahama | 250/201 |
| 5,007,690 | 4/1991 | Chern | 369/103 |
| 5,062,098 | 10/1991 | Hori | 369/112 |
| 5,066,138 | 11/1991 | Toide | 369/112 |
| 5,111,449 | 5/1992 | Kurata | 369/44.37 |
| 5,253,237 | 10/1993 | Miyake | 369/44.12 |
| 5,293,367 | 3/1994 | Kadowaki | 359/103 |

Primary Examiner—Georgia Y. Epps
Assistant Examiner—Ricky Mack
Attorney, Agent, or Firm—Spencer & Frank

[57] ABSTRACT

This invention relates to an optical pickup system which can detect focus errors and tracking errors without using diffraction grating. The optical pickup system comprises a laser diode for emitting laser beams, an objective lens for focusing the laser beam from the laser diode onto an optical disc, a two division hologram positioned between the laser diode and the objective lens for diffracting beams after separating a reflected beam reflected at the optical disc and passed through the objective lens into a first laser beam and a second laser beam along an tangential line to a track of the optical disc, and a four division photodetector for focusing the two laser beams diffracted by the two division hologram.

9 Claims, 7 Drawing Sheets

OPTICAL PICKUP SYSTEM

This is a continuation of application Ser. No. 08/193,585, filed on Feb. 8, 1994, abandoned.

FIELD OF THE INVENTION

This invention relates to an optical pickup system which detects information stored on an optical disc with laser beams, more particularly to an optical pickup system which can detect focus errors and tracking errors without using diffraction grating.

BACKGROUND OF THE INVENTION

Figure 1:
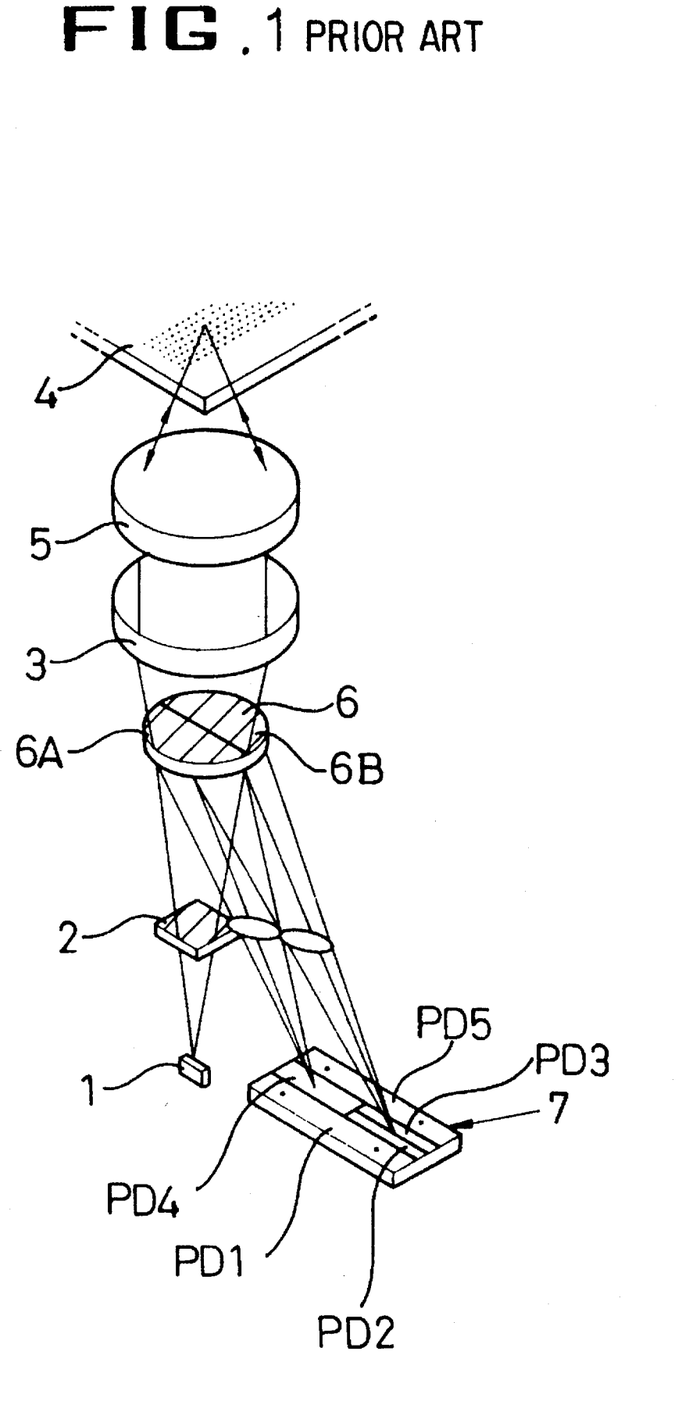
FIG. 1 is a perspective view of a conventional optical pickup system.

In general, an optical pickup system, as shown in FIG. 1, for compact disc players, video disc players, optical disc drivers and multi-disc players includes a laser diode 1 as a light source, a diffraction grating 2 generating tracking beams by dividing the laser beam emitted from the laser diode 1 into three diffraction beams (an 0 order 1 order −1 order), a collimator 3 converting each of the three diffraction beams from the diffraction grating 2 into parallel beams, an objective lens 5 focusing the three parallel beams from the collimator 3 onto an optical disc 4, a two division hologram 6 positioned between the diffraction grating 2 and the collimator 3 for diffracting the reflected beams of the optical disc 4 passed through the objective lens 5 and the collimator 3 successively, and a five division photodetector 7 the reflected beams diffracted by the two division hologram 6 being focused thereon.

The two division hologram 6 has a first hologram 6A and a second hologram 6B, and the photodetector 7 has a first to a fifth light reception area PD1 to PD5.

The laser beam emitted from the laser diode 1, passing through the diffraction grating 2 for generating tracking beams, is divided into 0 order, 1 order and −1 order diffraction beams. The 0 order laser beam serves to detect focus errors and information signals of the optical disc 4, and the 1 order and the −1 order laser beams serves to detect tracking errors.

Each of the three diffraction beams divided in the diffraction grating 2, after passing the hologram 6, is convened into parallel beams in the collimator 3, which parallel beams are focused onto the optical disc 4 by the objective lens 5. The three laser beams focused on the optical disc 4 are reflected to pass the objective lens 5 and the collimator 3 successively and diffracted in different angles by the first hologram 6A and the second hologram 6B of the two division hologram 6 to be focused onto the first through the fifth light reception area PD1 thru PD5.

The 0 order laser beam is focused onto the fourth light reception area PD4 by the first hologram 6A and onto a boundary line between the second and the third light reception area PD2 and PD3 by the second hologram 6B. The one order and the minus one order laser beams are focused onto the first and the fifth light reception areas PD1 and PD5 by the first and the second holograms 6A and 6B, respectively.

Figures 2A, 2B, 2C:
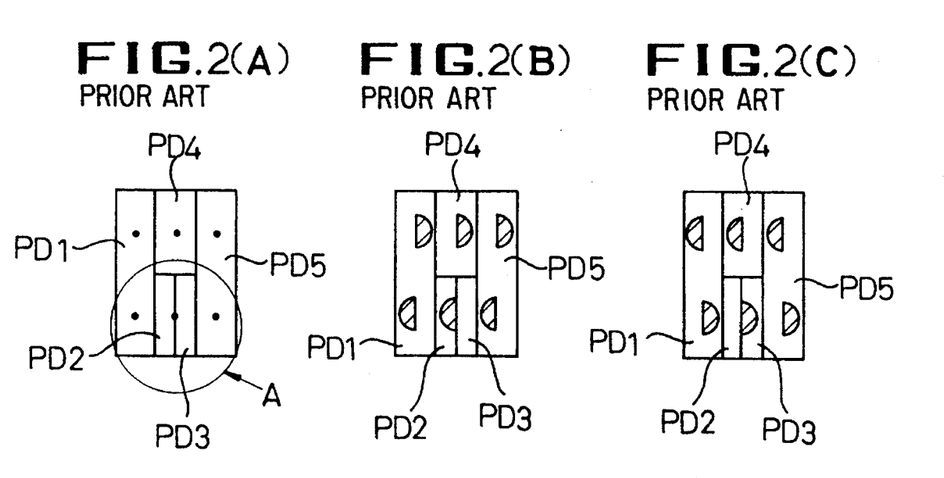
FIG. 2(A) to 2(C) explains change of shape of a beam focusing onto an photodetector by displacement of an optical disc in an optical pickup system shown in FIG. 1.

FIGS. 2(A) to 2(C) explains a change of beam shapes on the photodetector 7 according to a displacement of the optical disc 4 shown in FIG. 1.

Where a focus error signal, a tracking error signal and an optical information signal are defined as follows;

focus error signal=S2−S3 tracking error signal=S1−S5, and light information signal=S2+S3+S5, wherein the S1 to S5 are the light reception signals of the first to the fifth light reception areas PD1 to PD5 of the photodetector 7, respectively.

It can be seen that, when the focus error signal is greater than zero, it indicates that a distance between the optical disc 4 and the objective lens becomes wider (FIG. 2(B)), when less than zero, becomes narrower (FIG. 2(C)) and when zero, no focus error has been occurred (FIG. 2(A)). Also it can been seen that, according to the tracking error being >0 or <0, whether the main beam (zero order diffraction beam) follows along a track of the optical disc 4 exactly. By means of such focus error signal and tracking error signal, the focus error and the tracking error can be corrected enabling to read an optical information correction signal recorded on the optical disc 5 correctly.

Figure 3:
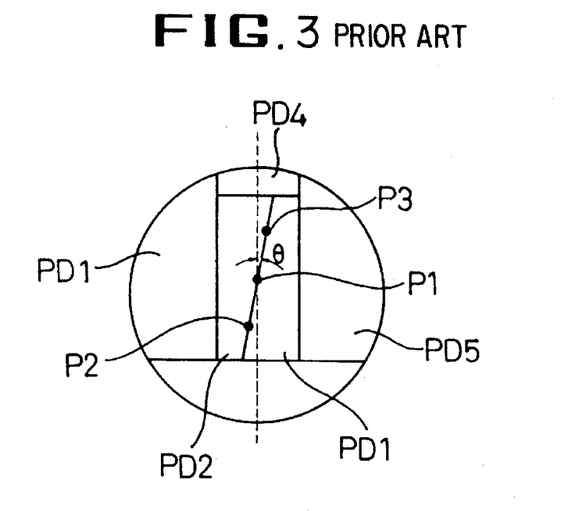
FIG. 3 is an enlargement of part A of FIG. 2(A).

In the meantime, the wave length of the laser diode 1 used as a light source can be changed depending on environmental temperature wherein, when the wave length is changed, because of the diffraction angle changes by the diffraction grating 2 and the two division hologram 6, an error similar to the focus error and the tracking error develops. As shown in FIG. 3 which is an enlargement of "A" part shown in FIG. 2(A), when the boundary between the second and the third light reception areas PD2 and PD3 of the photodetector 7 is kept to have a certain angle θ, the error by the change of the wave length can be corrected.

For example, when the wave length of the laser beam emitted from the laser diode 1 is 780 nm, the laser beam focuses onto a first position P1, when 775 nm, onto a second position P2, and when 785 nm, onto a third position P3. Because the focus error signal can be kept to be zero even though the wave length of the laser beam is changed in a state when the focus error has not been developed when a line connecting centers of the focusing positions P1 to P3 moving as described above is taken as the boundary line between the second and the third areas PD2 and PD3, an error according to the change of the wave length can be prevented.

However, in a optical pickup system described above, as a three beam detection method, a separate diffraction grating which divides a laser beam into three beans to be used. Accordingly alignments between the diffraction grating and the hologram and between the diffraction grating and the hologram, and the photodetector is required, which alignment technique is very difficult resulting to raise a problem of dropping the productivity. Further, prevention of errors come from changes of wave length by sloping the boundary line between the second and the third light reception areas of the photodetector for correction of the wave length of the laser beam, drops productivity making the production cost hike.

SUMMARY OF THE INVENTION

The object of this invention is to provide an optical pickup system which can minimize the number of elements used and can detect focus errors and tracking errors.

Other object of this invention is to provide an optical pickup system which can align the elements used with ease.

These and other objects and the features of this invention can be achieved by providing an optical pickup system comprising a laser diode for emitting laser beams, an objective lens for focusing the laser beam from the laser diode onto an optical disc, a two division hologram positioned between the laser diode and the objective lens for diffracting beams after separating a reflected beam reflected at the optical disc and passed through the objective lens into a first laser beam and a second laser beam along an tangential line to a track of the optical disc, and a four division photodetector for focusing the two laser beams diffracted by the two division hologram.

BRIEF DESCRIPTION OF THE DRAWINGS

FIGS. 6(A) and 6(B) explains diffraction of laser beams by a two divisional hologram used in an optical pickup system in accordance with this invention, wherein FIG. 6(A) is shown on YZ plane, and FIG. 6(B) is shown on XZ plane.

DETAILED DESCRIPTION OF THE INVENTION

Figure 4:
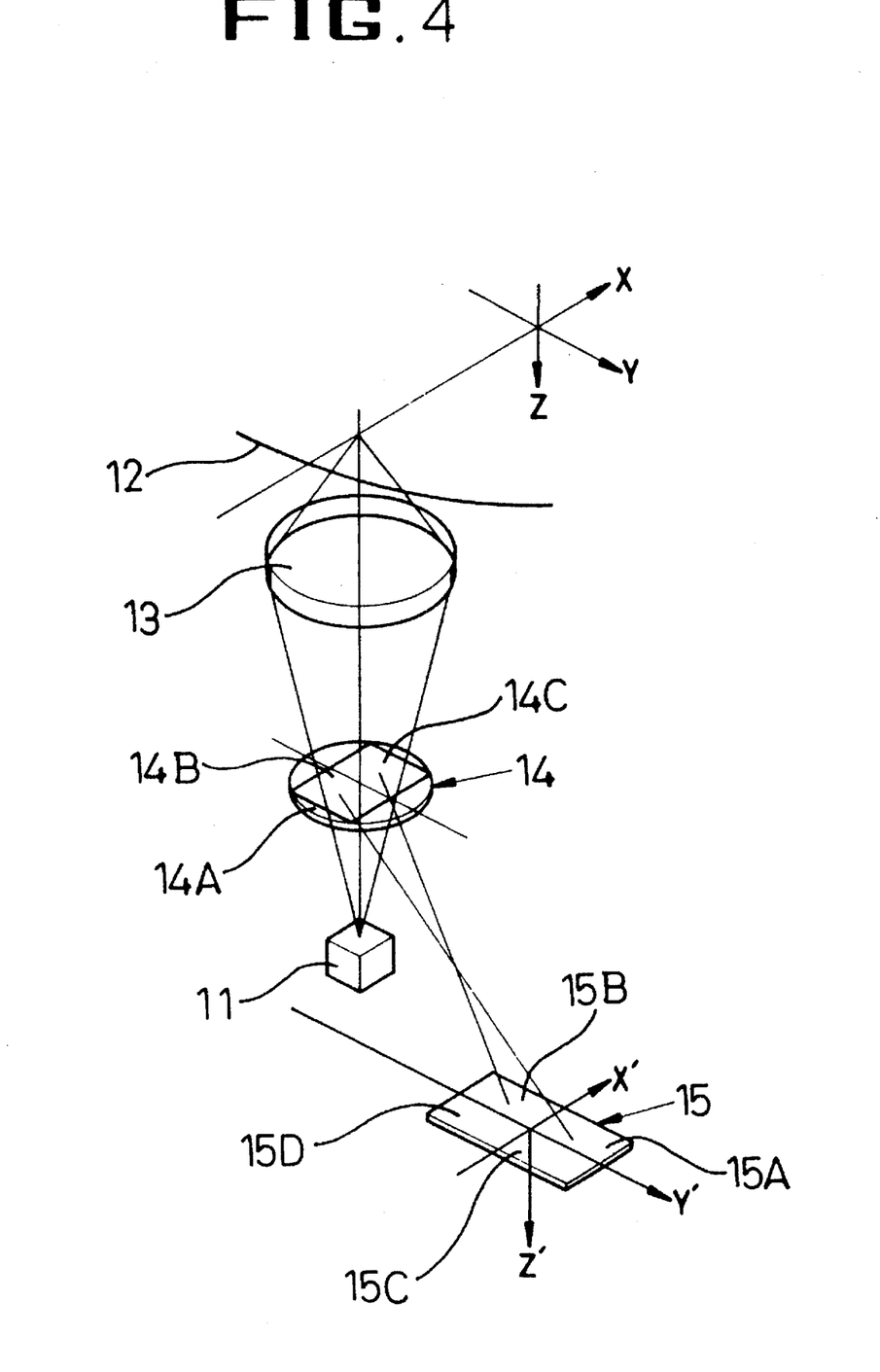
FIG. 4 is a perspective view of an optical pickup system in accordance with this invention.

FIG. 4 is a perspective view of an optical pickup system in accordance with this invention including a laser diode 11 as a light source, an objective lens 13 for focusing a laser beam emitted from the laser diode 11 onto an optical disc 12, a two division hole gram 14 positioned between the laser diode 11 and the objective lens 13 for diffracting a reflected beam at the optical disc 12 passed through the objective lens 13, and a four division photodetector 15 for focusing the laser beam diffracted by the two division hologram 14.

Figure 5:
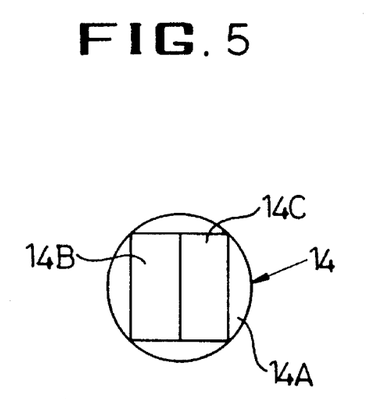
FIG. 5 is a plan view of a two division hologram used in an optical pickup system in accordance with this invention.

The two division hologram 14, as shown in FIG. 5, has a first hologram 14B and a second hologram 14C formed on a transparent glass substrate 14A, which serve to diffract after separating the reflected beam at the optical disc 12 into two laser beams along the tangential line to a track of the optical disc 12. The four division photodetector 15 has a first to a fourth light reception areas 15A to 15D.

Position of a reference beam for the first and the second hologram 14B and 14C of the two division hologram 14 is the position of the laser diode 11, position of an objective beam of the first hologram 14B is at a position P11 after the photodetector 15, and position of an objective beam of the second hologram 14C is at a position P12 before the photodetector 15.

Figure 6A:
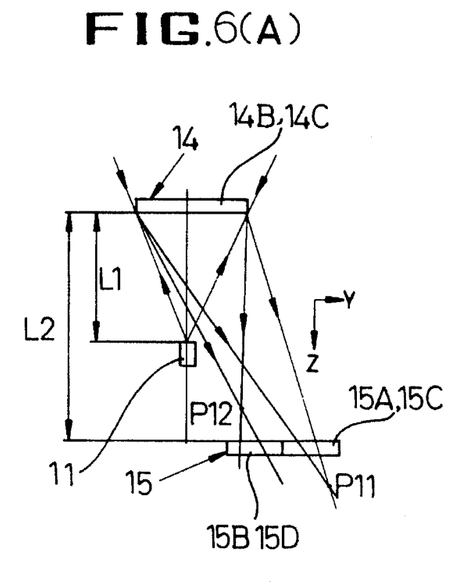
Figure 6B:
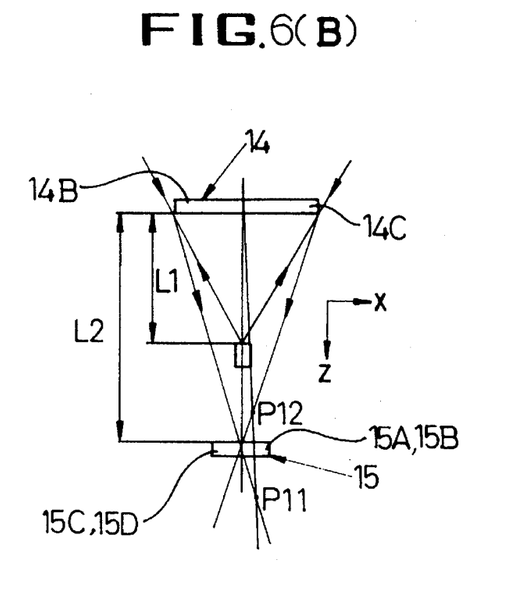

That is, as shown in FIGS. 6(A) and 6(B), when the laser beam focused onto the position of the laser diode 11 is incident to the first hologram 14B, the laser beam is focused onto a position P11 after the first light reception area 15A of the four division photodetector 15, and the laser beam incident to the second hologram 14 is focused onto a position P12 before the second light reception area 15B. Further, as shown in FIG. 7(A) sections of the laser beams cut by the photodetector 15 when the laser beams focused by the first and the second hologram 14B and 14C were passed through the photodetector 15 is positioned within the first light reception area 15A contacting with the boundary line between the first and the third light reception areas 15A and 15C for the laser beam focused by the first hologram 14B, and within the second light reception area 15B contacting with the boundary line between the second and the fourth light reception areas 15B and 15D for the laser beam focused by the second hologram 14C.

Figure 7A:
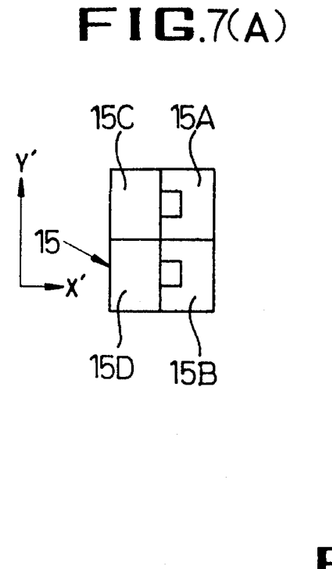
FIGS. 7(A) to 7(C) explains a construction of a photodetector in accordance with this invention.
Figure 7B:
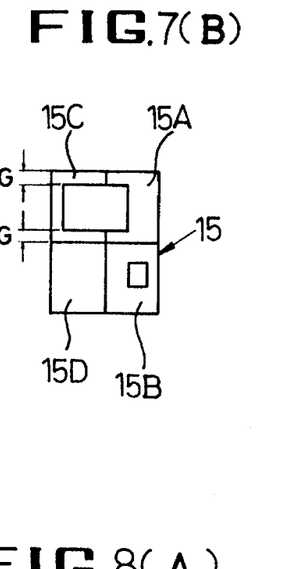
Figure 7C:
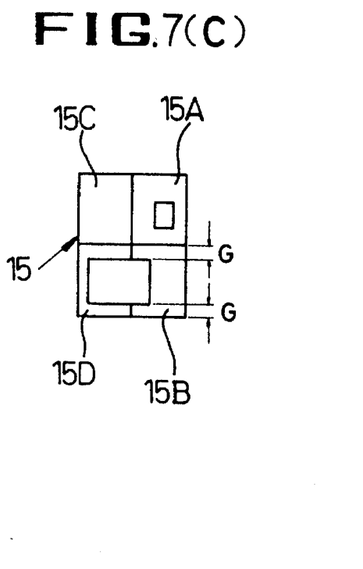

And, as shown in FIG. 7, the sizes of the first to the fourth light reception area 15A to 15D of the photodetector 15 are provided to be capable to accommodate the maximum size of a beam increasing in −X' direction for the third light reception area 15C and a beam increasing after decreased in X' direction for the second light reception area 15B when the distance between the optical disc 12 and the objective lens 13 becomes narrower to the maximum, and are provided to be capable to accommodate a beam increasing after decreased in X' direction for the first light reception area 15A and the maximum size of a beam increasing in −X' direction for the fourth light reception area 15D when the distance between the optical disc 12 and the objective lens 13 becomes wider to the maximum. And the sizes of the first to the fourth light reception area 15A to 15D is provided to be greater than the sizes of beams when the beams are increased to the maximum by a certain amount G in up and down direction, respectively (preferably, more than 20 μm). And the laser diode 11 is positioned between the two division hologram 14 and the photodetector 15. That is, as shown in FIGS. 6(A) and 6(B), the distance L2 between the hologram and the photodetector 15 is provided to be greater than the distance L1 of the two division hologram 14 and the laser diode 11.

In an optical pickup system in accordance with this invention as described above, the laser beam of the laser diode 11 is divided into 0 order, 1 order and −1 order diffracted beams on passing through the two division hologram 14, wherein only the 0 order diffracted beam is focused onto the optical disc 12 by the objective lens 13.

The laser beam focused onto the optical disc 12 is reflected and is focused onto the laser diode 11 by the objective lens 13. In this time, the focusing position of the laser beam is the light emission surface of the laser diode 11.

When such a focused beam is incident to the two division hole gram 14, by serving as a reference beam of the two division hologram, the objective beam is reproduced at the position of the objective beam (P11 and P12 in FIGS. 6(A) and 6(B)), and by detecting this reproduced beam with the pohotodetector 15, a signal required to operate the optical pickup system is generated.

The focused beam incident to the two division hologram 14 is focused onto the position P11 after the photodetector by the first hologram 14B and onto the position P12 before the photodetector 15 by the second hologram 14C. These focusing positions P11 and P12 changes depending on the changes of the distance between the optical disc 12 and the objective lens 13.

Because the size of beam detected in the photodetector 15 changes depending on the changes of the focusing positions, utilizing which the focus error can be detected.

Figure 8A:
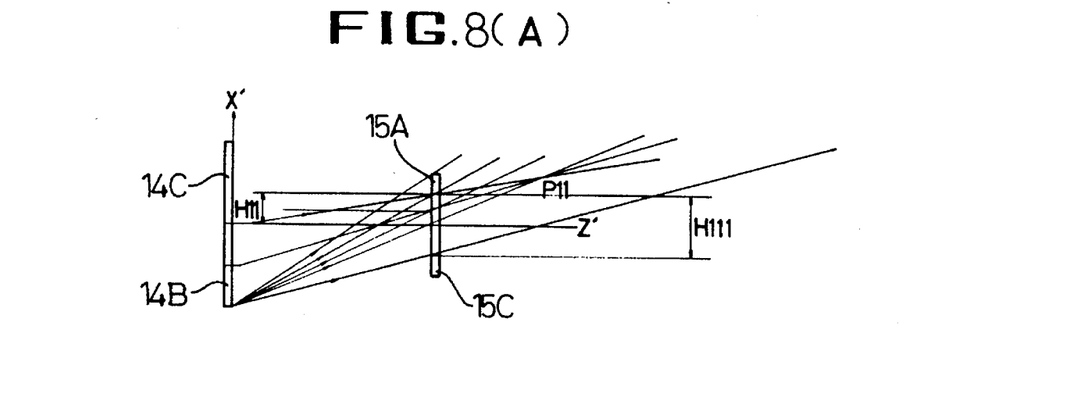
FIGS. 8(A) and 8(B) explains changes of size of a beam on a photodetector by a two division hologram in accordance with this invention.
Figure 8B:
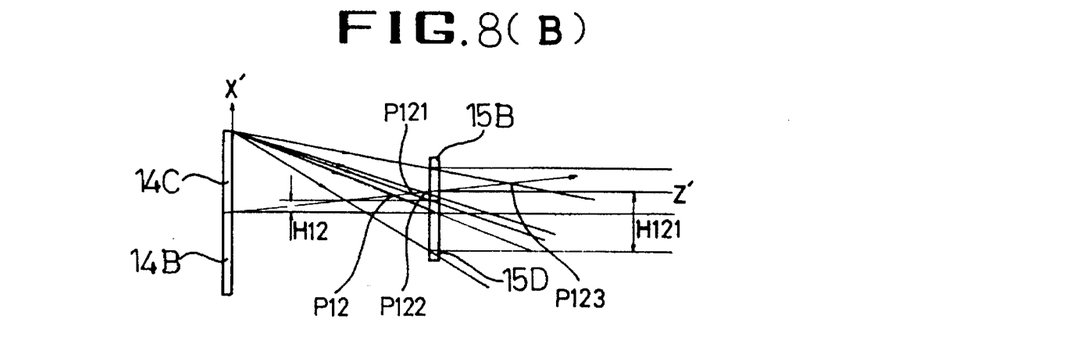
Figure 9A:
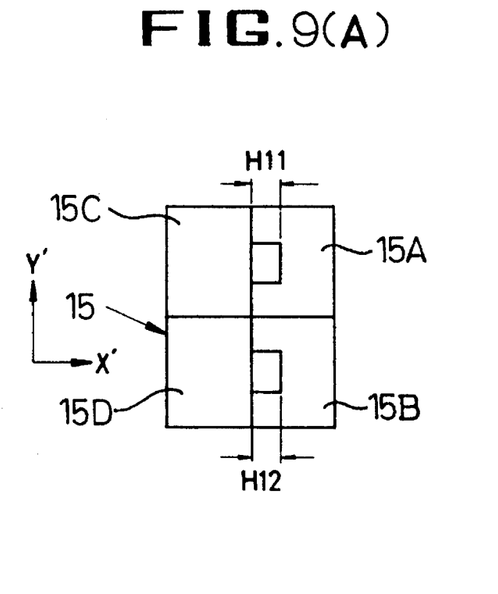
FIGS. 9(A) to 9(D) and FIGS. 10(A) to 10(D) explain changes of size of a laser beam in a photodetector in accordance with this invention.
Figure 9B:
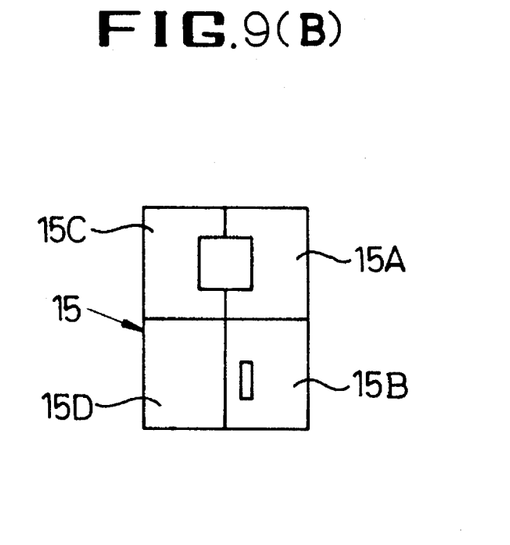
Figure 9C:
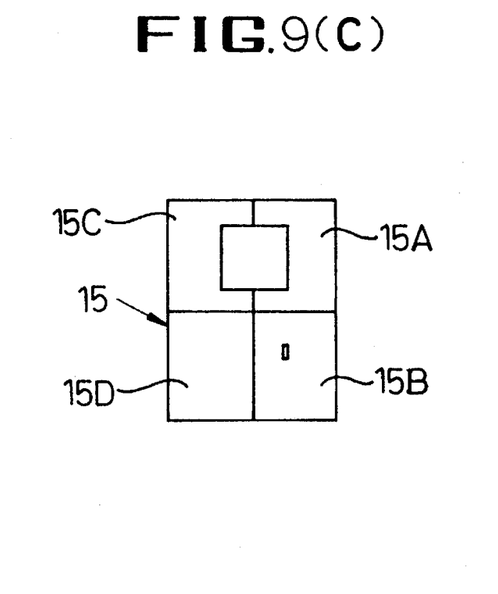
Figure 9D:
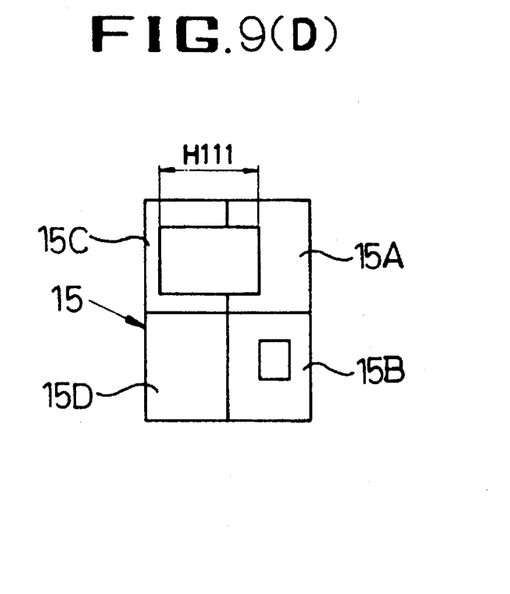
Figure 10A:
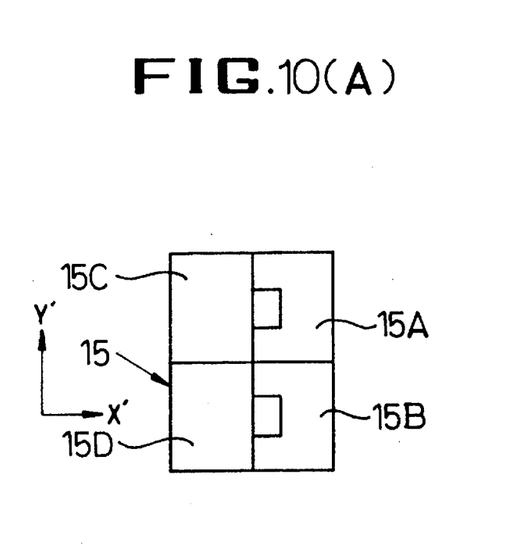
Figure 10B:
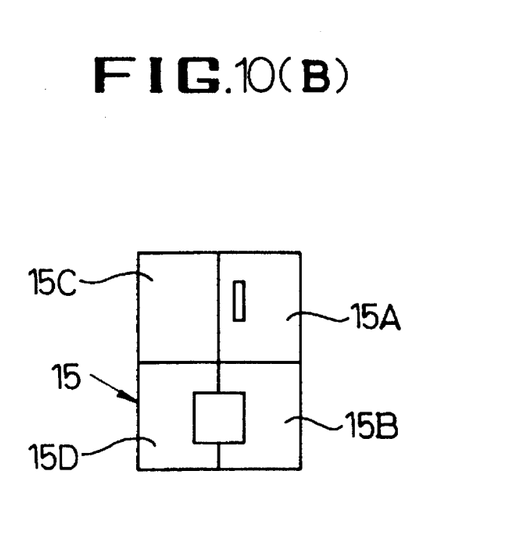
Figure 10C:
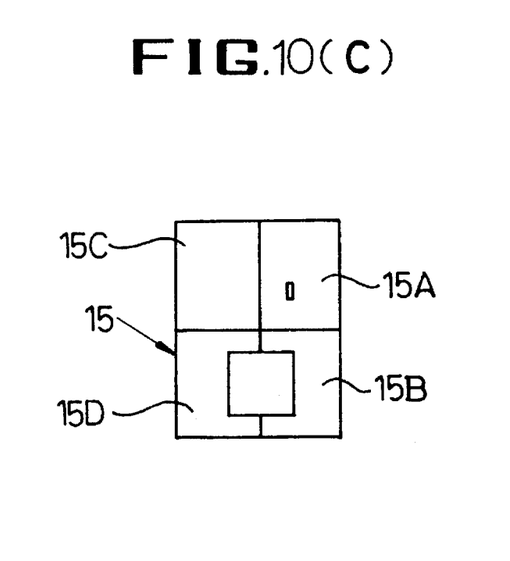
Figure 10D:
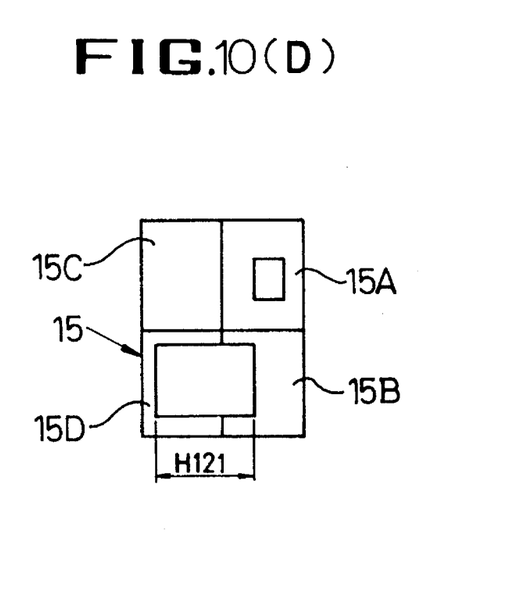

Referring to FIGS. 8 to 10, the detail is to be explained hereinafter.

When the distance between the optical disc 12 and the objective lens 13 becomes narrower, the laser beams focused by the first and the second hologram 14B and 14C are focused at a position farther than the positions P11 and P12 of the objective beams, and the size of the laser beam focused onto the first light reception area 15A of the photodetector 15 by the first hologram 14B begins greater than the size of H11 to become H11 when a maximum focus error is developed (the distance between the optical disc 12 and the objective lens 13 becomes the minimum). On the other hand, the size of the laser beam focused onto the second light reception area PD2 of the photodetector 15 by the second hologram 14C moves from the position P12 of the objective lens to positions P121, P122 and P123 as the focus error becomes greater (the distance between the optical disc 12 and the objective lens 13 becomes narrower) to become the size of the beam from H12 to H121.

The reason of increase of the size of the laser beam after decrease is that, when the focus error is being increased gradually (that is, the optical disc 12 and the objective lens 13 is coming closer gradually), the focusing position of the laser beam by the second hologram 14C moves toward the photodetector 15 to form a smallest size of beam when the focusing position reaches on the photodetector 15 (P122 position), and when the focus error is further increased for the focusing position to pass the photodetector 15, the size of beam on the photodeteter 15 is increased in a direction of decrease. When the optical disc 12 and the objective lens 13 depart farther, causing a phenomena opposite to above, the size of the laser beam changes as the focus error is being increased (the optical disc 12 and the objective lens 13 depart farther gradually) (FIG. 10).

Therefore, the focus error signal, the tracking error signal and the optical information signal can be difined in following formula;

focus error signal=(S11+S14)−(S12+S13).

tracking error signal=(S11+S13)−(S12+S14), and optical information signal=S11+S12+S13+S14, wherein S11 to S14 are light reception signals of the first to the fourth light reception area 15A to 15D of the photodetector 15.

When any focus errors have not been developed, the focus error signal becomes zero, the focus error developed because the distance between the optical disc 12 and the objective lens 13 becomes narrower becomes less than zero because a sum of the light reception signals S11+S14 of the first and the fourth light reception areas lea and led is lower than the sum of the light reception signals S12+S13 of the second and the third light reception areas 15B and 15C, and the focus error developed because the distance between the optical disc 12 and the objective lens 13 becomes greater than zero because a sum of the light reception signals S11+S14 of the first and the fourth light reception areas 15A and 15D is higher than the sum of the light reception signals S12+S13 of the second and the third light reception areas 15B and 15C. Accordingly, the focus error can be corrected by moving the objective lens 13 up and down according to the value of the focus error signal.

And, as the boundary line between the first and the second hologram 14B and 14C of the two division hologram 14 is identical with the tangential direction of the optical disc 12, when the laser beam focused on the optical disc 12 is deviated to inner side of the track, ie., toward the center of the optical disc 12, the sum of the light reception signals of the second and the fourth light reception areas 15B and 15D S12+S14 becomes greater than the sum of the light reception signals of the first and the third light reception area 15A and 15C S12+S14 to lead the tracking error signal lower than zero, and the laser beam focused on the optical disc 12 is deviated to outer side of the track, opposite to above, the tracking error signal becomes higher than zero. Accordingly, the tracking error can be corrected by moving the objective lens 13 left and right according to the value of the tracking error signal.

In addition to the focus error and the tracking error described above, because the focusing positions of the laser beams diffracted and focused by the hologram 14 according to the changes of wave length of the laser beam of the laser diode 11 move along Y' axis so that the laser beam of the first hologram 14B is detected in the second and the fourth light reception areas 15B and 15D, and for the laser beam of the second hologram 14C is detected in the first and the third light reception areas 15A and 15C, though any focus error and tracking error have not been developed, errors as if such errors have been developed are developed.

However, in this invention, because the sizes of the first to the fourth light reception areas 15A to 15D are formed greater by a certain amount G in up and down direction than the sizes of the laser beams H111 and H121 when the maximum focus error is developed, when the focusing positions move along the Y' axis by the changes of wave length of the laser beam, it can be prevented that the laser beam of the first hologram 14B is detected by the second or the fourth light reception area 15B or 15D, or the laser beam of the first hologram 14B is detected by the second or the fourth light reception area 15B or 15D. In conclusion, errors due to changes of wave length can be eliminated.

Moreover, by adding all the light reception signals S11 to S14 of the first to the fourth light reception areas 15A to 15D, optical information signals recorded on the optical disc 12 can be read.

According to this invention as described above, by only using a two division hologram and a 4 division photodetecter without providing a diffraction grating and by using the size of beam and employing push-pull method, focus errors and tracking errors can be detected with single beam method.

Accordingly, manufacture of smaller and lighter products is made possible, and also reduction of production cost, easy alignment of optical parts and an improvement of productivity are made possible.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. An optical pickup system having means for detecting focus and tracking errors without using a diffraction grating comprising:

a laser diode for emitting laser beams;

an objective lens for focusing the laser beam from the laser diode onto an optical disc;

a two division hologram positioned between the laser diode and the objective lens for diffracting beams after separating a reflected beam reflected at the optical disc and passed through the objective lens into a first laser beam and a second laser beam along an tangential lens to track of the optical disc; and a four division photodetector including a first to a fourth light reception areas, said four division photodetector having focused thereon the two laser beams diffracted by the two division hologram wherein the two division hologram has a first and a second hologram, a position of an objective beam of the first hologram is at a position after the photodetector, and a holographic focus point of the second hologram is at a position before the photodetector.

2. The optical pickup system as claimed in claim 1, wherein the first laser beam of the two division hologram is focused at a position after the first light reception area, and the second laser beam is focused at a position before the second light reception area, and a laser beam by the first hologram of a section of a laser beam cut by the four division photodetector positions on the first light reception area contacting with a boundary line of the first and the third light reception areas, and the laser beam by the second hologram positions on the second light reception area contacting with a boundary line of the second and the fourth light reception areas.

3. The optical pickup system as claimed in claim 1,
wherein the first to the fourth light reception areas are directionally arrayed such that an ordinate line Y extends between the second and the fourth light reception areas and between the first and the third light reception areas, and such that an abscissa line X extends between the second and the first light reception areas and between the fourth and the third light reception areas; and wherein the sizes of the first to the fourth light reception area of the photodetector;

provide a means to accommodate the maximum size of a beam increasing in a −X direction from the ordinate line Y for the third light reception area and a beam increasing after decreased in a X direction from the ordinate line Y for the second light reception area when the distance between the optical disc and the objective lens becomes narrower to the maximum, and provide a means to accommodate a beam increasing after decreased in a X direction from the ordinate line Y for the first light reception area and the maximum size of a beam increasing in a −X direction from the ordinate line Y for the fourth light reception area when the distance between the optical disc and the objective lens becomes wider to the maximum.

4. A method of using the optical pickup system as claimed in claim 1, comprising the steps of;

focusing the first laser beam of the two division hologram at a position after the first light reception area, and focusing the second laser beam at a position before the second light reception area; and positioning a section of a laser beam from the first hologram cut by the four division photodetector on the first light reception area contacting with a boundary line of the first and the third light reception areas, and positioning the laser beam by the second hologram on the second light reception area contacting with a boundary line of the second and the fourth light reception areas.

5. A method of using the optical pickup system as claimed in claim 4, wherein the first to the fourth light reception areas are directionally arrayed such that an ordinate line Y extends between the second and the fourth light reception areas and between the first and the third light reception areas, and such that an abscissa line X extends between the second and the first light reception areas and between the fourth and the third light reception areas; and further comprising the steps of:

with the sizes of the first to the fourth light reception area of the photodetector, accommodating the maximum size of a beam increasing in a −X direction from the ordinate line Y for the third light reception area and a beam increasing after decreased in a X direction from the ordinate line Y for the second light reception area when the distance between the optical disc and the objective lens becomes narrower to the maximum, and with the sizes of the first to the fourth light reception area of the photodetector, accommodating a beam increasing after decreased in a X direction from the ordinate line Y for the first light reception area and the maximum size of a beam increasing in a −X direction from the ordinate line Y for the fourth light reception area when the distance between the optical disc and the objective lens becomes wider to the maximum.

6. An optical pickup system having means for detecting focus and tracking errors without using a diffraction grating comprising:

a laser diode for emitting laser beams;

an objective lens for focusing the laser beam from the laser diode onto an optical disc;

a two division hologram positioned between the laser diode and the objective lens for diffracting beams after separating a reflected beam reflected at the optical disc and passed through the objective lens into a first laser beam and a second laser beam along an tangential lens to track of the optical disc; and a four division photodetector having focused thereon the two laser beams diffracted by the two division hologram wherein the two division hologram has a first and a second hologram, a position of an objective beam of the first hologram is at a position after the photodetector, and a holographic focus point of the second hologram is at a position before the photodetector;

the four division photodetector having a first to a fourth light reception areas, the first laser beam of the two division hologram being focused at a position after the first light reception area, the second laser beam being focused at a position before the second light reception area, and a laser beam by the first hologram of a section of a laser beam cut by the four division photodetector being positioned on the first light reception area contacting with a boundary line of the first and the third light reception areas, and the laser beam by the second hologram being positioned on the second light reception area contacting with a boundary line of the second and the fourth light reception areas;

the first to the fourth light reception areas being directionally arrayed such that an ordinate line Y extends between the second and the fourth light reception areas and between the first and the third light reception areas, and such that an abscissa line X extends between the second and the first light reception areas and between the fourth and the third light reception areas; and the sizes of the first to the fourth light reception area of the photodetector providing (1) means for accommodating the maximum size of a beam increasing in a −X direction from the ordinate line Y for the third light reception area and a beam increasing after decreased in a X direction from the ordinate line Y for the second light reception area when the distance between the optical disc and the objective lens becomes narrower to the maximum, and (2) means for accommodating a beam increasing after decreased in a X direction from the ordinate line Y for the first light reception area and the maximum size of a beam increasing in a −X direction from the ordinate line Y for the fourth light reception area when the distance between the optical disc and the objective lens becomes wider to the maximum.

7. The optical pickup system as claimed in claim 6, wherein the first to fourth light reception areas have means for axial movement which is greater than the maximum axial beam size.

8. The optical pickup system as claimed in claim 6, when the first to fourth light reception areas have means for axial movement of more than 20 μm.

9. The optical pickup system as claimed in claim 6, wherein the laser diode is positioned between the two division hologram and the photodetector.

* * * * *